No. 774,947.

Patented November 15, 1904.

UNITED STATES PATENT OFFICE.

HENRY COLBECK MICHELL, OF LONDON, ENGLAND.

MANUFACTURE OF NON-CONDUCTING COVERINGS, BLOCKS, AND SLABS.

SPECIFICATION forming part of Letters Patent No. 774,947, dated November 15, 1904.

Application filed November 27, 1903. Serial No. 182,888. (No model.)

*To all whom it may concern:*

Be it known that I, HENRY COLBECK MICHELL, a subject of the King of Great Britain and Ireland, residing in the city of London, England, have invented an Improved Manufacture of Non-Conducting Coverings, Blocks, and Slabs, of which the following is a specification.

This invention has reference to an improved manufacture of that kind of non-conducting coverings, blocks, and slabs suitable for covering steam-pipes, boilers, and the like to protect them from loss of heat by radiation and for other purposes where it is desired to prevent the passage or flow of heat that are composed of or contain asbestos and a silicious binding agent, such as silicate of soda, with or without addition of other ingredients; and it has for its object to produce non-conducting coverings, blocks, or slabs of the kind mentioned that shall be more durable and efficient in use than those heretofore produced. For this purpose in the manufacture of non-conducting coverings, blocks, and slabs composed of or containing asbestos and a fusible silicious binding agent—for example, silicate of soda, clay, and the like—such coverings, blocks, or slabs (hereinafter, including the claims, referred to generally as "non-conducting" bodies) after being molded or formed to shape and dried, as heretofore, are subjected to a high temperature in such a manner as to cause the silicious binding agent used to unite or combine with the asbestos in the non-conducting body in such a way as to render the latter very durable and efficient. The heating may conveniently be effected by firing in a kiln at a temperature, say, for example, up to about 1,000° centigrade, (one thousand degrees centigrade,) so as to fuse, vitrify, or cause the silicate of soda in the non-conducting body to unite chemically with the asbestos and form a compound silicate therewith.

The non-conducting bodies may be built up and formed to shape in the manner heretofore usual—as, for example, by spreading the asbestos in a loose, broken-up, or fluffy condition in or on a suitable support or mold, distributing a solution of silicate of soda over the layer of asbestos, drying the layer of mixed asbestos and silicate of soda, and firing the same in a kiln, or the asbestos and solution of silicate of soda may be intimately mixed together in the mass, as by hand or by a mixing-machine, then molded to shape or spread out in layers and then dried and fired.

The solution of silicate of soda may be of the strength (75° Twaddell) ordinarily sold in commerce and be used in such proportion with the asbestos as to form therewith a wet mass having the consistency of, say, ordinary wet mortar, so that the result of heating the mixture, as set forth, will be to cause the asbestos by the fusion or vitrification of the silicate to adhere firmly together without causing the non-conducting body to lose its shape. Any excess of silicate of soda that may be present in the body when formed to shape will be caused to exude therefrom during the preliminary drying thereof by heat.

The interiors of non-conducting bodies made as described may be charged with non-conducting material of various kinds—for example, mica and light porous or open filling material of the kind described in the specification of Letters Patent of the United States granted to me, No. 732,207.

Although in the example given 1,000° centigrade has been mentioned as a suitable temperature to which a non-conducting body according to this invention might be heated, I do not limit myself to such temperature, as in some cases lower or higher temperatures might with reasonable limits be advantageously employed so long as the requisite union of the ingredients is effected.

Non-conducting bodies may be produced as hereinbefore described with close and durable outer crusts or shells inclosing inner portions consisting of light porous or open filling material of the kind hereinbefore referred to or may be formed of an intimate mixture of asbestos, filling material, a binding agent, and a non-hygroscopic substance and molded to shape as described with reference to micaceous coverings, blocks, or slabs in my said former specification. When such open or filling material consists wholly or partly of matter that will be charged or burned out during the subsequent heating of the non-conducting body, the porosity and non-conducting properties of the resulting product will in many cases be enhanced.

Although the invention has been described with more particular reference to non-conducting bodies for preventing loss of heat by radiation, it is obvious that such bodies are also applicable for preventing absorption of heat—as, for example, in the case of pipes used for conveying cooled brine in refrigerating apparatus.

What I claim is—

The herein-described method of making non-conducting bodies, which consists in forming an intimate mixture of asbestos and silicate of soda, subjecting the mixture to extreme heat to fuse the silicate and chemically unite the elements, and slowly cooling the mass, whereby a dense hard vitreous product is obtained.

Signed at London, England, this 18th day of November, 1903.

HENRY COLBECK MICHELL.

Witnesses:
F. D. JAMESON,
H. RAND.